(12) United States Patent
Hong et al.

(10) Patent No.: US 11,523,463 B2
(45) Date of Patent: Dec. 6, 2022

(54) DISASTER SITE INTEGRATED COMMANDING AND OPERATING SYSTEM AND METHOD OF PROVIDING THE SAME

(71) Applicant: WINITECH CO., LTD., Daegu (KR)

(72) Inventors: Seung Bok Hong, Daegu (KR); Dong Ju Yu, Daegu (KR); Young Gi Lee, Daegu (KR); Kyo Koan Chu, Daegu (KR)

(73) Assignee: WINITECH CO., LTD., Daegu (KR)

( * ) Notice: Subject to any disclaimer, the term of this patent is extended or adjusted under 35 U.S.C. 154(b) by 104 days.

(21) Appl. No.: 17/191,571

(22) Filed: Mar. 3, 2021

(65) Prior Publication Data

US 2021/0282219 A1    Sep. 9, 2021

(30) Foreign Application Priority Data

Mar. 6, 2020 (KR) .................. 10-2020-0028040

(51) Int. Cl.
*H04W 76/50* (2018.01)
*H04W 4/90* (2018.01)
*H04W 76/40* (2018.01)

(52) U.S. Cl.
CPC ............. *H04W 76/50* (2018.02); *H04W 4/90* (2018.02); *H04W 76/40* (2018.02)

(58) Field of Classification Search
CPC ....... H04W 76/50; H04W 4/90; H04W 76/40; H04W 4/08
See application file for complete search history.

(56) References Cited

U.S. PATENT DOCUMENTS

2014/0189887 A1* 7/2014 Raju .................. G06Q 10/06
726/28

* cited by examiner

*Primary Examiner* — Keith Ferguson
(74) *Attorney, Agent, or Firm* — H.C. Park & Associates, PLC

(57) ABSTRACT

A method for a disaster site integrated commanding and operating system includes: receiving, by the disaster site integrating commanding and operating system, organization information for responding to a disaster site; specifying a first operation group corresponding to the organization information, wherein the first operation group includes a first commanding network group corresponding to a first commanding network including a first communication terminal of at least one first commanding officer, and a first operation network group corresponding to a first operation network including second communication terminals of operation resources included in the organization information; and transmitting a control signal to perform grouping of communication terminals connected to a disaster safety communication network for each group network of the specified first commanding network and first operation network, wherein the first communication terminal and the second communication terminal are each set to follow a group rule predetermined in a corresponding group.

20 Claims, 7 Drawing Sheets

DISASTER SITE INTEGRATED COMMANDING AND OPERATING SYSTEM AND METHOD OF PROVIDING THE SAME

CROSS REFERENCE TO RELATED APPLICATION

This application claims priority from and the benefit of Korean Patent Application No. 10-2020-0028040, filed on Mar. 6, 2020, which is hereby incorporated by reference for all purposes as if fully set forth herein.

BACKGROUND

Field

Embodiments/implementations of the invention relate generally to a disaster site integrated commanding and operating system, and a method of providing the same and, more specifically, the present invention relates to a system capable of adaptively and efficiently controlling commanding in a disaster site according to a situation of the disaster site, such as commanding the disaster site, changing and integrating operation resources, and a method of providing the same. One or more embodiments provide for a more efficient and responsive disaster recovery command and control network, in more particularly to efficiently assign wireless resources and computer resources to handle the disaster.

Discussion of the Background

In a disaster site, prompt and systematic command, communications between operation resources (operation members, operation equipment, etc.), and distribution of the resources are very important.

Particularly, there are cases in which resources of a metropolitan area larger than a city or a county are simultaneously deployed when a large-scale disaster occurs, and in these cases, it is difficult to promptly establish a commanding system for responding to the disaster in an effective manner.

In addition, continuously changing commanding, commanding according to an operation system, and communications between operation resources should be changed quickly due to the nature of on-site response task. In conventional systems there is a limit as to how promptly field situations are reflected with respect to continuous change and management of wireless communication resources by an operation group or a commanding system.

Therefore, it is desired to provide a technique for efficiently controlling wireless communication resources indispensable for commanding or deploying an operation according to a situation in a disaster site.

The above information disclosed in this Background section is only for understanding of the background of the inventive concepts, and, therefore, it may contain information that does not constitute prior art.

SUMMARY

Devices constructed/methods according to implementations/embodiments of the invention are capable of providing disaster site recovery by efficiently controlling communication resources used to manage and control a disaster recovery operation.

An object of the invention is to provide a system and method, which can collectively set, change, and control a commanding network and an operation network using a disaster safety communication network (e.g., a Public Safety-Long Term Evolution or PS-LTE network).

In addition, another object of the invention is to provide a system and method, which can effectively reflect a situation to a commanding system when the commanding network or the operation network needs to be changed according to a situation in the field.

In addition, another object of the invention is to provide a system and method, which can control management of the right and function of operation resources in an integrated manner.

To accomplish the above objects, according to an aspect of the invention, there is provided a method of providing a disaster site integrated commanding and operating system, the method including the steps of: receiving, by the disaster site integrated commanding and operating system, organization information for responding to a disaster site; specifying, by the disaster site integrated commanding and operating system, a first operation group corresponding to the organization information, wherein the first operation group includes a first commanding network group corresponding to a first commanding network including a first communication terminal of at least one first commanding officer, and a first operation network group corresponding to a first operation network including second communication terminals of a plurality of operation resources included in the organization information; and transmitting a control signal to perform grouping of communication terminals connected to a disaster safety communication network for each group network of the specified first commanding network and first operation network, wherein each of the first communication terminal and the second communication terminals is set to follow a group rule predetermined in a corresponding group, on the basis of the transmitted control signal.

The method of providing a disaster site integrated commanding and operating system may further include the step of storing information on group status of each working group including the first commanding network group and the first operation network group included in the first operation group, wherein a setting rule may be set for each working group.

The organization information may include information on a plurality of operation teams including a first operation team and a second operation team, and the step of specifying a first operation group may include the step of separately specifying a sub-operation network group corresponding to each of the first operation team and the second operation team.

The group rule may include a communication rule for specifying a communication target, which is another communication terminal belonging to a predetermined group, capable of receiving information input into a communication terminal included in the group.

The setting rule may be set for each group, and include information rules about recording or videotaping field situations and inquiring or replaying information performed during an operation.

The method of providing a disaster site integrated commanding and operating system may further include the steps of: maintaining, by the disaster site integrated commanding and operating system, information on a second operation group including a second commanding network group and a second operation network group; receiving, by the disaster site integrated commanding and operating system, a commanding authority transfer signal for transferring commanding authority so that a second commanding officer corresponding to the second operation group is under the command of a first commanding officer corresponding to the first operation group; and reorganizing, by the disaster site integrated commanding and operating system, an integrated operation group integrating the first operation group and the second operation group to correspond to a commanding system corresponding to the transfer of commanding authority in response to the commanding authority transfer signal.

The disaster safety communication network may be a Public Safety LTE (PS-LTE) communication network.

A method of providing a disaster site integrated commanding and operating system according to another embodiment includes the steps of: receiving, by the disaster site integrated commanding and operating system, organization information for responding to a disaster site; specifying, by the disaster site integrated commanding and operating system, communication terminals accessible to a disaster safety communication network as a plurality of groups to correspond to the received organization information; grouping, by the disaster site integrated commanding and operating system, the communication terminals by transmitting a control signal so that grouping corresponding to the plurality of specified groups may be performed; outputting, for display on a management system, commanding system information including group status information of the plurality of grouped groups; receiving, by the disaster site integrated commanding and operating system based on output from the management system, a change request for changing the commanding system information; and regrouping, by the disaster site integrated commanding and operating system, the communication terminals to correspond to the change request in response to the received change request.

The method may be implemented by a computer program recorded on a computer-readable recording medium.

A disaster site integrated commanding and operating system according to another aspect of the invention includes: a management module configured to receive organization information for responding to a disaster site; a setting module configured to specify a first operation group including a first commanding network group corresponding to a first commanding network including a first communication terminal of at least one first commanding officer included in the received organization information among communication terminals accessible to a disaster safety communication network, and a first operation network group corresponding to a first operation network including second communication terminals of a plurality of operation resources included in the organization information; and a control module configured to transmit a control signal so that grouping of communication terminals connected to the disaster safety communication network is performed for each group network of the specified first commanding network and first operation network, wherein each of the first communication terminal and the second communication terminal is set to follow a setting rule predetermined in a corresponding group, on the basis of the transmitted control signal.

The management module may store information on group status for each working group including the first commanding network group and the first operation network group included in the first operation group, and set the setting rule for each working group.

When the setting module receives a commanding authority transfer signal for transferring commanding authority from the management module so that a second commanding officer corresponding to a second operation group is under the command of a first commanding officer corresponding to the first operation group, the setting module may reorganize, while maintaining information on the second operation group including a second commanding network group and a second operation network group, an integrated operation group integrating the first operation group and the second operation group to correspond to a commanding system corresponding to the transfer of commanding authority in response to the received commanding authority transfer signal.

According to another aspect of the invention, there is provided a disaster site integrated commanding and operating system including: a management module configured to receive organization information for responding to a disaster site; a setting module configured to specify communication terminals accessible to a disaster safety communication network as a plurality of groups to correspond to the received organization information; and a control module configured to group the communication terminals by transmitting a control signal so that grouping corresponding to the plurality of specified groups may be performed, wherein the management module displays commanding system information including group status information of the plurality of grouped groups on a management system, and receives a change request for changing the commanding system information from the management system, and the setting module regroups the communication terminals to correspond to the change request in response to the received change request.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
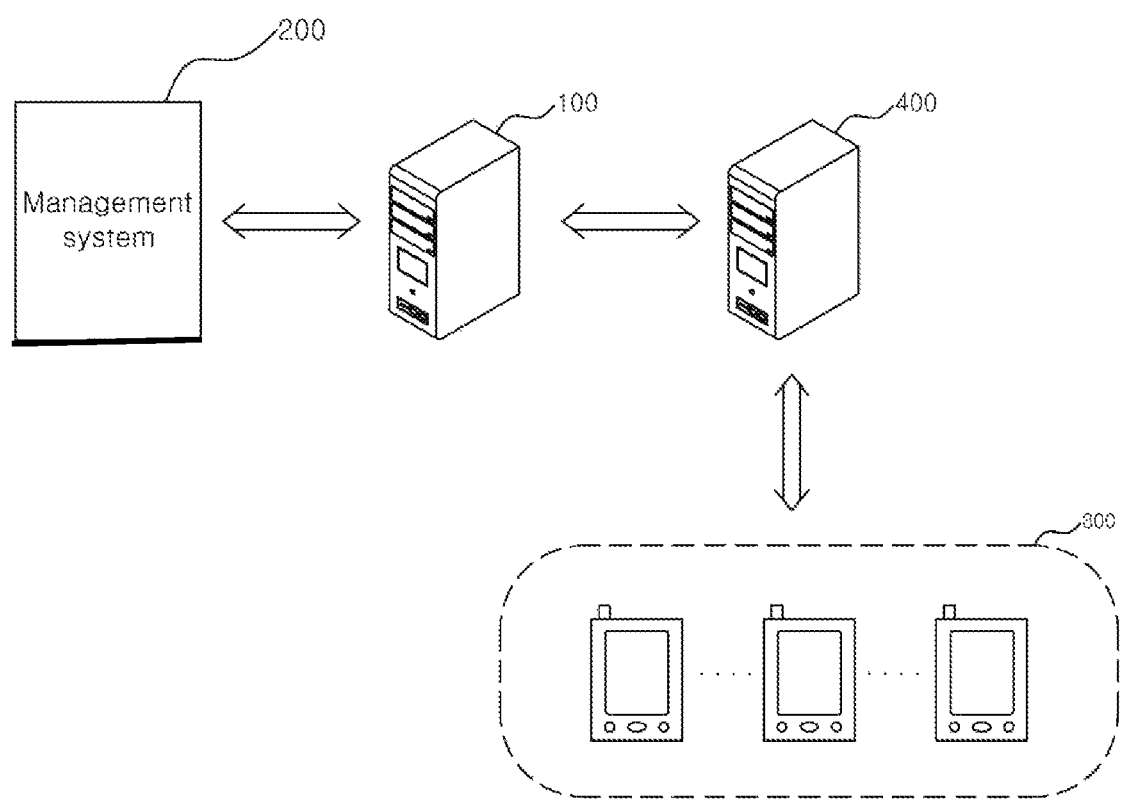
FIG. 1 is a view for explaining schematic system configurations for implementing a method of providing a disaster site integrated commanding and operating system constructed according to principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element or layer, there are no intervening elements present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a view for explaining schematic system configurations for implementing a method of providing a disaster site integrated commanding and operating system constructed according to principles of the invention.

Referring to FIG. 1, a disaster site integrated commanding and operating system 100 may be implemented to perform a method of providing a disaster site integrated commanding and operating system according to an embodiment of the invention.

The disaster site integrated commanding and operating system 100 may communicate with the management system 200 and the environment control server 400. The disaster site integrated commanding and operating system 100 controls the environment control server 400 to set a communication environment for a commanding network and/or an operation network in case of a disaster.

The management system 200 may correspond to a system used by a commanding headquarters in charge of overall commanding in a disaster site. For example, it may correspond to a system used by an organization in charge of overall and integrated commanding of a disaster, such as a system provided in a 911 main control center to communicate with the disaster site integrated commanding and operating system 100 and/or an emergency rescue standard system according to a disaster. A physically separate system may be included in the management system 200 as needed.

In any case, a system that controls the communication environments of groups participating in an operation by controlling the disaster site integrated commanding and operating system 100 according to embodiments of the invention may be defined as the management system 200.

For example, when a disaster occurs, the management system 200 may transmit organization information, which is information on the organization of resources to be deployed in the disaster, and/or commanding system information to the disaster site integrated commanding and operating system 100. The organization information may include information on deployed resources, units (teams, etc.) of the deployed resources, a commander of each unit, a general commander of an operation, and the like. That is, the organization information includes information on organization members included in the deployed resources, and may further include information on position, duty, and the like.

The commanding system information may include information on the commanding system (commander, commanding line, etc.). In addition, according to implementation examples, the commanding system information may include both the commanding system information and the organization information. Therefore, when the organization information includes information on the commanding system (commander, commanding line, etc.) of deployed resources, the organization information itself may be the commanding system information. Alternatively, when there is a plurality of operation teams (groups), the commanding system information may be information including the organization information of each of the plurality of operation teams (groups) corresponding to each operation group and information on the commanding system of the plurality of operation teams.

Depending on implementation examples, the commanding system information may include only information on the commanding system, i.e., information on commander or commanders and the commanding line between the commanders, and may not include information on the field operation members.

In any case, the disaster site integrated commanding and operating system 100 may receive the organization information and/or the commanding system information from the management system 200, and control the environment control server 400 so that corresponding commanding networks and/or operation networks may be set in the communication terminals 300 of deployed resources in response to the received information.

The commanding network may correspond to a network established between the commanding headquarters and commanders and/or between commanders to issue orders from the commanding side, and the operation network may correspond to a network between communication terminals used by the operation resources (commanders and operation team members/operation equipment). In addition, in this specification, the commanding network may correspond to a communication network between the communication terminals of commanders and the commanding headquarters included in the commanding network, and a commanding network group may correspond to a set of operation resources corresponding to the commanding network. In addition, an operation network group may correspond to a set of operation resources corresponding to the operation network.

In addition, the disaster site integrated commanding and operating system 100 may maintain/manage group status information for each of currently working groups, and provide the information to the management system 200 in a predetermined manner so that the user of the management system 200 may confirm.

The working group may denote a commanding network group and/or an operation network group currently in operation. Although it is general that only the operation network group is classified as a working group, commanding network groups belonging to the commanding network may also be separately maintained and managed as needed.

Then, the management system 200 may collectively set a communication environment for each group by using information on the working groups, i.e., group status information. In addition, when the management system 200 changes the group status information (change of operation groups or change of commanding systems, etc.), it transmits the changed information to the disaster site integrated commanding and operating system 100 so that the communication environment of the commanding network and/or the operation network may be reset to correspond to the changed information.

As a result, according to embodiments of the invention, when a conventional commanding headquarters generally commanding a disaster response determines that it needs to change the organization of operation resources or the commanding system, although a process of resetting the communication environment between the operation resources is not performed individually to reflect the change, as the disaster site integrated commanding and operating system 100 is provided, when information indicating a change in the organization of operation resources or the commanding system is generated, the disaster site integrated commanding and operating system 100 may set the communication environment between the operation resources to correspond to the generated information.

Therefore, there is an effect of rapidly and efficiently perform an operation that meets the intention of the commanding side by rapidly reflecting a change in the organization of the operation resources or the commanding system according to a situation during an operation, in the communication environment of the operation resources.

Setting or changing a communication environment may denote setting or changing communication groups that the communication terminals may communicate with according to the groups to which the operation resources belong and/or their positions (whether an operation resource is a team member or a commander, etc.), or setting or changing communication rules about communication directions, granting of a right to speak, and the like.

In addition, setting or changing a communication environment may denote setting or changing of authority to record, inquire, transmit, access, and replay information that each communication terminal may perform, i.e., information rules about various information (images, voices and the like excluding direct dialogues between the operation resources) generating in a disaster situation.

As a result, according to embodiments of the invention, as setting and/or resetting of a communication environment between operation resources is accomplished rapidly and efficiently according to the intention of the commanding headquarters, there is an effect of rapidly accomplishing an operation of a disaster response that meets the intention of the commanding headquarters.

The environment control server 400 may be a system for performing setting or resetting of communication environments for the communication terminals 300 connected to a disaster safety communication network, e.g., a Public Safety LTE (PS-LTE) network. For example, the environment control server 400 may include a Mission Critical Push to Talk (MCPTT) server for the PS-LTE network. In addition, the environment control server 400 may include a configuration server for managing user profiles and terminal identification information, and a group management server for managing communication groups. Since configurations for communication of the disaster safety communication network are already known, detailed descriptions thereof will be omitted in this specification for sake of brevity.

When the management system 200 performs setting/resetting of organization of the operation groups and/or the commanding system, the environment control server 400 may receive a control signal for performing the setting/resetting from the disaster site integrated commanding and operating system 100. The control signal may include information on communication terminals to be set or reset, communication rules, information rules, and the like.

Then, a terminal setting signal is transmitted from the environment control server 400 to the communication terminals to correspond to the control signal, and a communication environment may be set through a response thereto. That is, the environment control server 400 may set communication rules and information rules for each of the communication terminals while performing communication with necessary ones among the communication terminals 300 to correspond to the control signal.

A result of the setting may be stored in the environment control server 400 and notified to the disaster site integrated commanding and operating system 100.

Then, the disaster site integrated commanding and operating system 100 may maintain/manage group status information, i.e., information on the groups of the operation resources and/or information on the communication rules and information rules set for the group, and report the information to the management system 200 so that the commanding headquarters may easily confirm.

Figure 2:
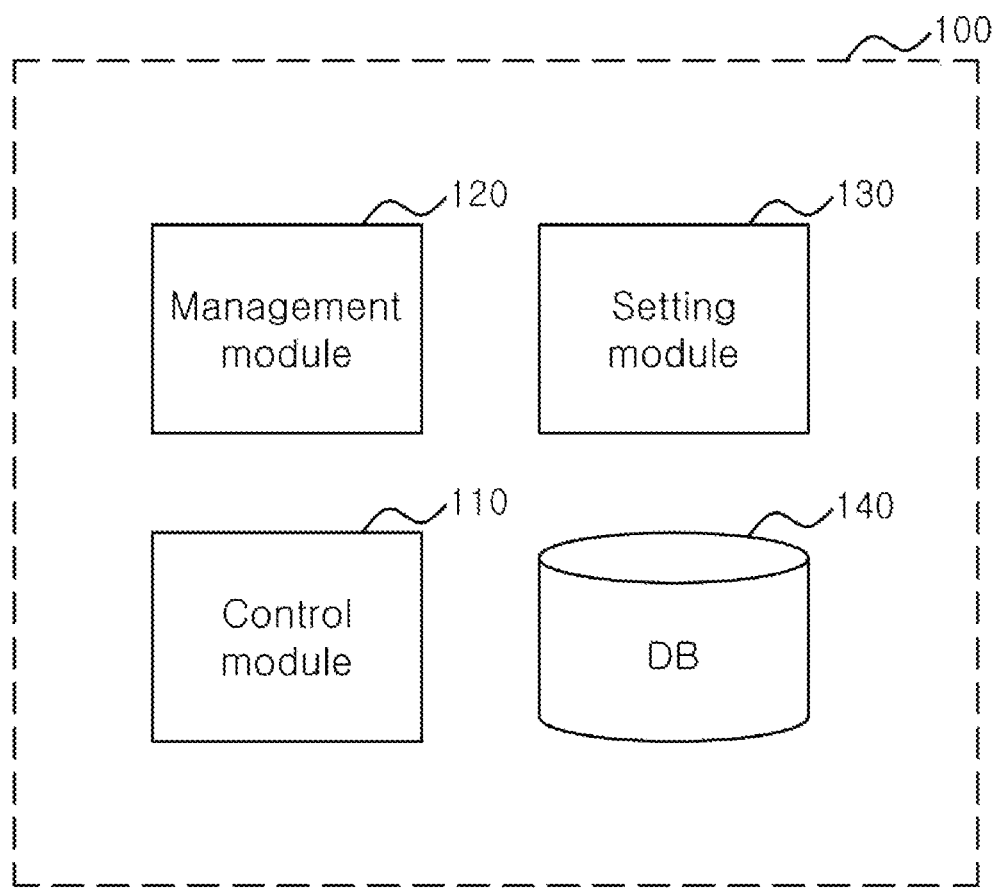
FIG. 2 is a view showing a schematic configuration of a disaster site integrated commanding and operating system according to an embodiment.

The configuration of the disaster site integrated commanding and operating system 100 for implementing embodiments of the invention may be as shown in FIG. 2.

FIG. 2 is a view showing a schematic configuration of a disaster site integrated commanding and operating system according to an embodiment Referring to FIG. 2, the disaster site integrated commanding and operating system 100 includes a control module 110, and a management module 120, and a setting module 130. According to embodiments, the disaster site integrated commanding and operating system 100 may further include a database (DB) 140.

The disaster site integrated commanding and operating system 100 may denote a logical configuration provided with hardware resources and/or software needed to implement embodiments of the invention, and does not necessarily correspond to a physical component or a device. That is, the disaster site integrated commanding and operating system 100 may correspond to a logical combination of hardware and/or software provided to implement embodiments of the invention, and may be implemented as a set of logical components if needed by being installed in the devices separated from each other and performing their functions to implement embodiments of the invention. In addition, the disaster site integrated commanding and operating system 100 may correspond to a set of components separately implemented for each function or role for implementing embodiments of the invention.

In addition, as described herein, a module may correspond to a functional or structural combination of hardware for performing embodiments of the invention and software for driving the hardware. For example, those skilled in the art may easily infer that the module may denote a predetermined code and a logical unit of hardware resources for executing the predetermined code, and does not necessarily denote a physically connected code or a single type of hardware.

The control module 110 may control the functions and/or resources of other components (e.g., the management module 120, the setting module 130 and/or the DB 140) included in the disaster site integrated commanding and operating system 100 to provide services according to embodiments of the invention.

The management module 120 may perform communication with the management system 200. The management module 120 may receive organization information and/or commanding system information of the operation resources from the management system 200 as described above.

Then, the setting module 130 may specify a group to correspond to the received organization information and/or commanding system information.

That the setting module 130 specifies a group may denote specifying information for grouping the communication terminals 300 to correspond to the organization information and/or the commanding system information. For example, when the organization information and/or the commanding system information includes information for grasping identification information (names or the like), positions, commanding lines, organization charts, or the like of operation resources, the setting module 130 may generate identification information of communication terminals corresponding to the operation resources and information defining their relations (commanding line, organization structure, etc.) so that the communication terminals 300 may be actually grouped to correspond to the organization information and/or the commanding system information. That is, while grouping corresponding to the organization information and/or the commanding system information is performed, the setting module 130 may specify information that the environment control server 400 may recognize.

In addition, the setting module 130 may set information that defines setting rules to be applied to the grouped communication terminals. These setting rules may be received from the management system 200 and be stored in a predetermined DB 140 of the disaster site integrated commanding and operating system 100.

Then, the setting module 130 may define the rules for communication between the communication terminals included in the grouped operation network, for example, information on the rules or sequences may be defined in the communication rules, in which all or some of the communication terminals included in the same operation network may bidirectionally communicate and may not directly dialog with other communication terminals, or may unidirectionally communicate with some communication terminals, or when a certain communication terminal is speaking (when the subject of a communication terminal is speaking), speaking of the other communication terminals is limited. These communication rules may be specified by the setting module 130. Then, when a control signal including the set communication rules is transmitted to the environment control server 400, the environment control server 400 may set the communication terminals as defined in the communication rules while performing communications by transmitting a terminal setting signal to the communication terminals and receiving responses to the terminal setting signal.

In addition, the setting module 130 may define information rules so that the communication terminals may be set according to the predetermined information rules. Such information rules may be rules defining the right for recording, videotaping, replaying, inquiring, and transmitting of information. The management system 200 may generate a guideline of information rules that each operation resource should follow and transmit the guideline to the setting module 130, and then, the setting module 130 may generate information rules using the identification information of the communication terminals so that the guideline may be set to be actually suitable for the right of each of the communication terminals and recognized by the environment control server 400. Then, a control signal including the information rules may be transmitted to the environment control server 400, and the environment control server 400 may transmit a terminal setting signal to each of the communication terminals 300 so that setting of the information rules corresponding to the transmitted control signal may be accomplished. It goes without saying that each of the communication terminals 300 receiving the terminal setting signal or the environment control server 400 may initiate communication and complete the setting.

Accordingly, when the disaster site integrated commanding and operating system 100 performs a predetermined setting (grouping, setting/resetting of setting rules, etc.) for the communication terminals 300 according to embodiments of the invention, it may denote that the setting is performed through the environment control server 400.

The setting module 130 may perform the setting for the communication terminals 300 by applying preset default setting rules until new setting rules for the commanding network and/or the operation network are received from the management system 200. In addition, when the new setting rules are received from the management system 200, the setting module 130 may apply the received setting rules as setting rules to be applied to a unit group network (operation network or commanding network).

Also, the setting module 130 may set different individual setting rules, instead of common setting rules for each group network.

When the setting rules set by the setting module 130 are grouping setting for the organization of new operation resources, the setting module 130 may set a commanding network group, which is a communication network between the communication terminal of at least one commanding officer included in the organization information received from the management system 200 and the commanding headquarters. Setting of the commanding network group like this may be setting of a communication group between the communication terminal of at least one commanding officer of a corresponding operation group and the commanding headquarters, and setting of the setting rules.

In addition, the setting module 130 may specify an operation network group including a plurality of communication terminals of operation resources included in the organization information, and perform setting of a communication group and setting of setting rules for the group.

Then, the control module 110 may transmit a control signal to perform grouping for each group corresponding to the commanding network and for each group corresponding to the operation network. It goes without saying that the control signal may be transmitted from the control module 110 to the environment control server 400.

According to embodiments, the disaster site integrated commanding and operating system 100 may be provided to be integrated with the environment control server 400, and in this case, the control signal may be transmitted from an integrated device in a predetermined configuration of the environment control server 400, i.e., in a configuration generating and transmitting a terminal setting signal for grouping of the communication terminals, in a method such as a function call or the like.

At least one communication terminal belonging to the commanding network group may be set as a commanding network group through the terminal setting signal transmitted from the environment control server 400 based on the control signal, and each of the communication terminals belonging to the operation network group may be set as an operation network group.

In addition, each communication terminal may be set to follow group rules predetermined in a corresponding group.

The DB 140 may maintain/manage identification information of the operation resources (e.g., names of commanders and/or operation members, etc.) included in the organization information and/or the commanding system information and identification information of communication terminals used by the operation resources to match each other.

In addition, common group rules to be applied to each unit group network (commanding network or operation network) or individual group rules to be applied to each unit group network may be maintained/managed, and it goes without saying that organization information and commanding system information that can specify such group rules and/or information on the group rules (or information for changing the information) may be received from the management system 200.

In addition, the DB 140 may store group status information, which is information corresponding to currently set groups, i.e., working groups performing an operation for which a group network is set. The management module 120 may provide an interface capable of providing the group status information to the management system 200 in a method.

For example, information on the locations of groups performing an operation and the organization and the commanding system of the groups may be provided to the management system 200 through a predetermined graphic user interface, and a user of the management system 200, i.e., a person performing the integrated commanding, may intuitively confirm the current status of the operation group currently in operation through the group status information.

Then, the user may check the group status information displayed through the graphic user interface, and perform change of the commanding authority for the entire operation group or change of organization information and/or commanding system information of each operation group in a predetermined manner (e.g., drag and drop, etc.).

In addition, the management system 200 may set setting rules for each working group currently working (in operation). That is, by selecting any one group, the management system 200 may easily set or reset setting rules for the selected group, and the set information may be collectively applied to communication terminals belonging to the selected group.

Figure 3:
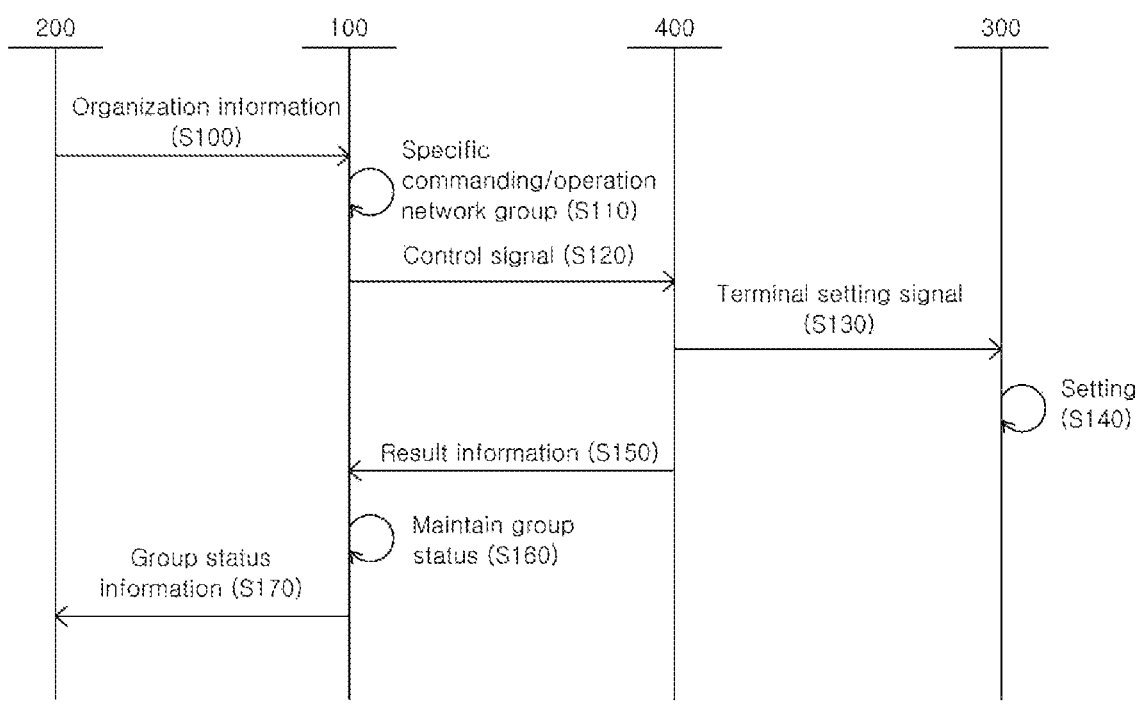
FIG. 3 is a view showing a schematic data flow for implementing a method of providing a disaster site integrated commanding and operating system according to an embodiment.

FIG. 3 is a view showing a schematic data flow for implementing a method of providing a disaster site integrated commanding and operating system according to an embodiment.

Referring to FIG. 3, the management system 200 may transmit organization information (or commanding system information) of an operation group that will perform a disaster response to the disaster site integrated commanding and operating system 100 when a disaster occurs (S100).

Then, the disaster site integrated commanding and operating system 100 may divide the operation resources into a commanding officer and other operation members on the basis of the received organization information (or commanding system information), and specify information for setting a group for a commanding network including the command headquarters and the commanding officer (e.g., identification information of corresponding communication terminals) and information for setting groups for the operation resources (S110).

Then, the disaster site integrated commanding and operating system 100 may transmit a control signal to the environment control server 400 so that a communication group may be set for each specified group (S120), and the environment control server 400 may transmit a terminal setting signal to corresponding communication terminals 300 so that a communication group corresponding to the received control signal may be set (S130), and therefore, the communication terminals 300 may be set to a commanding network communication group and an operation network communication group corresponding to the control signal (S140). When setting of the communication groups is completed, group rules including communication rules and/or information rules may be set for each communication group, and the group rules may be previously stored in the disaster site integrated commanding and operating system 100. According to embodiments, the management system 200 may separately transmit information on the group rules together with the organization information and/or the commanding system information for each operation group to the disaster site integrated commanding and operating system 100, and in this case, it goes without saying that the separately received group rules may be applied to a newly set operation group.

Setting of a communication group and group rules of the corresponding communication group may be completed by performing bidirectional communication between the communication terminals 300 and the environment control server 400, and when the setting is completed, the environment control server 400 may transmit information on a setting result, e.g., information indicating that a normal communication group has been set, to the disaster site integrated commanding and operating system 100 (S150).

Then, the disaster site integrated commanding and operating system 100 may maintain/manage the currently set group status information (S160), and provide the information to the management system 200 through a predetermined interface (S170).

Figure 4:
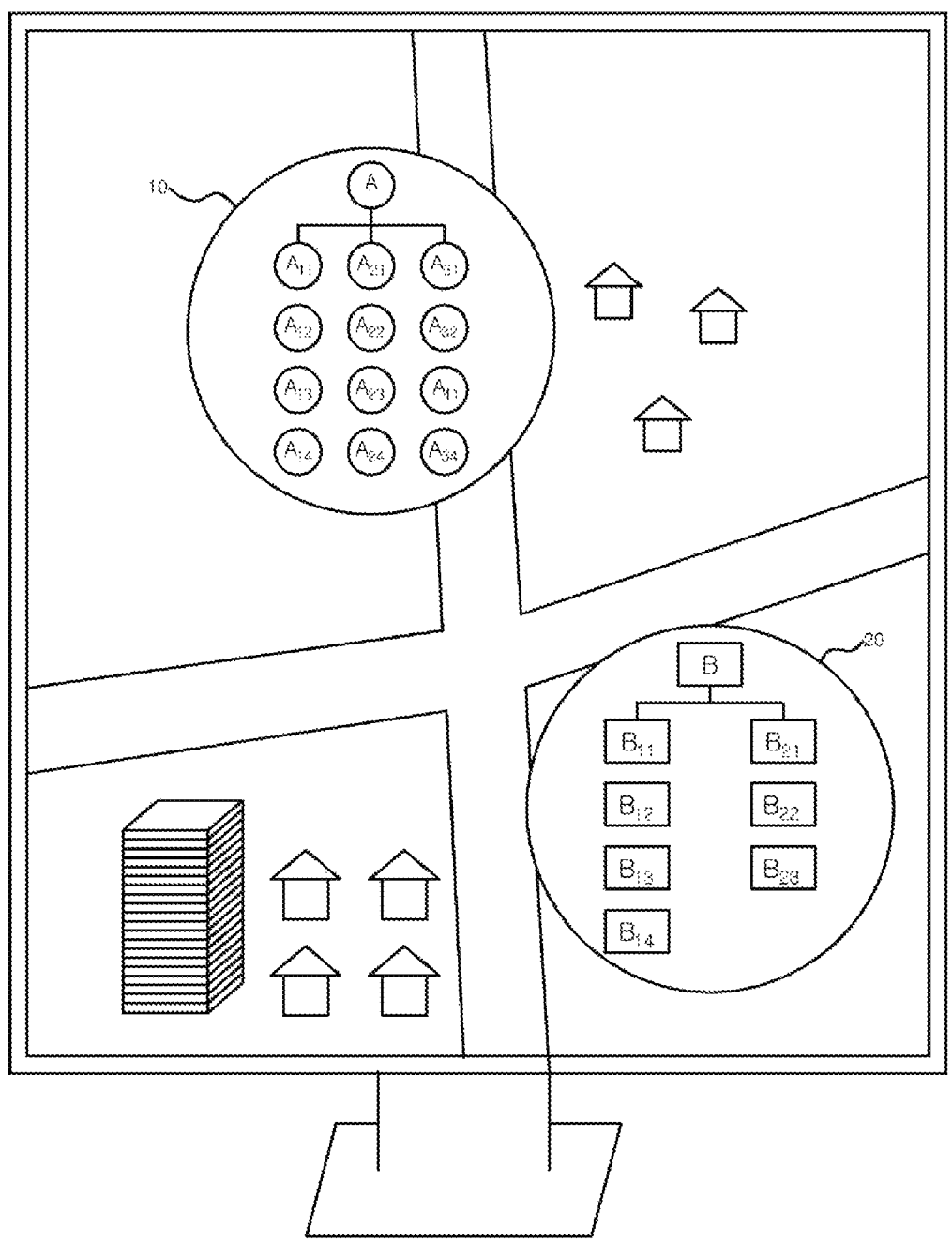
FIG. 4 is a view showing an example of group status information for controlling a communication environment according to an embodiment.

FIG. 4 is a view showing an example of group status information for controlling a communication environment according to an embodiment.

FIG. 4 shows an example of group status information generated by the management module 120 and provided to the management system 200, and as shown in FIG. 4, the management module 120 may transmit status information of currently set operation groups 10 and 20 to the management system 200. Although only the operation network group is displayed and the commanding network group is not separately displayed in FIG. 4, the commanding network group may be separately displayed as described above.

The group status information may include status information of a first operation group 10 and status information of a second operation group 20 as shown in FIG. 4, and each status information may include organization information (e.g., A and A11 to A34 in the case of the first operation group) and commanding system information (e.g., information indicating that the commander is A, and commanders of sub-operation teams are A11, A21 and A31, and/or information indicating that operation members A12, A13 and A14 are under the command of A11, operation members A22, A23 and A24 are under the command of A21, and operation members A32, A33 and A34 are under the command of A31) of an operation group. In addition, according to embodiments, information on the location of each operation group may be included.

Although the location of each operation group may individually indicate the location of each of the operation resources belonging to a corresponding operation group, when the locations of the operation resources are distributed in a wide area as shown in FIG. 4, it may be implemented to display the commanding system information and the organization information at the center of the deployed locations as shown in FIG. 4.

To this end, the disaster site integrated commanding and operating system 100 may receive the location of each communication terminal of the operation resources from the environment control server 400.

The integrated commanding headquarters operating the management system 200 may confirm the group status information as shown in FIG. 4 through the management system 200. In addition, when a specific operation resource of a predetermined operation group (e.g., 10 or 20) is selected by the management module 120 or automatically, the location and the current status (normal, operation is unable due to injury, etc.) of the corresponding operation resource may be displayed.

Accordingly, the management system 200 may adaptively perform resetting of an operation group in consideration of the locations and states of operation sources.

In addition, in the case of a large-scale disaster or the like, for which commanding through a systematic commanding system is required by integrating operation groups independent from each other (e.g., the first operation group and the second operation group) as described below, these independent operation groups may need to be integrated. For example, a new commanding system may be required by integrating the first operation group 10 and the second operation group 20 as shown in FIG. 4. In this case, a procedure of transferring the commanding authority of any one operation group (e.g., the second operation group) to the commander of the first operation group may be needed, and according to embodiments of the invention, the commanding system information included in the group status information may be conveniently used even in this case. This will be described in more detail below.

Figure 5:
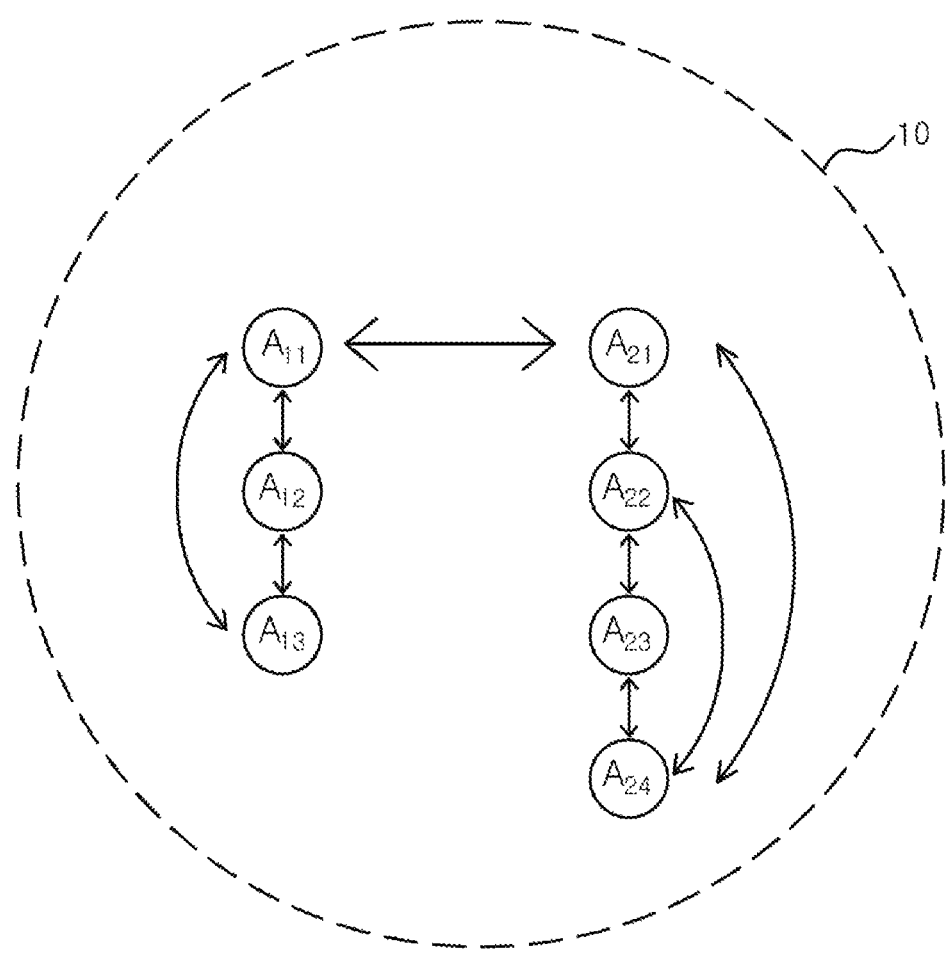
FIG. 5 is a view showing an example of a communication rule according to an embodiment.

FIG. 5 is a view showing an example of a communication rule according to an embodiment.

Referring to FIG. 5, the first operation group 10 as shown in FIG. 4 may include a plurality of operation teams including a first sub-operation team (e.g., A11 to A13) and a second sub-operation team (e.g., A21 to A24). That is, there may be sub-operation groups (operation teams), which are individual operation teams having a common commander and different commanding systems.

In this case, the communication rules of the first operation group 10 may be as shown in FIG. 5.

For example, bidirectional communications may be possible between A11, and A12 and A13, and bidirectional communication may also be possible between A21, and A22, A23 and A24. In addition, bidirectional communication may be possible between the commanders A11 and A21 of the sub-operation teams. However, for example, dialogues between operation members (e.g., A12 and A22) belonging to different sub-operation teams may be set not to allow communication.

In this case, the group network of the first operation group may be defined to have operation network groups corresponding to sub-operation teams, respectively. That is, it may also be defined that first sub-operation teams (e.g., A11 to A13) constitute any one sub-group network, and second sub-operation teams (e.g., A21 to A24) constitute another sub-group network. In addition, it may be defined that the sub-group networks are included in the group network of the first operation group.

In this case, it goes without saying that the setting module 130 may set a sub-group network for each sub-operation team, and set a commanding network between the commanders A11 and A21.

Figure 6:
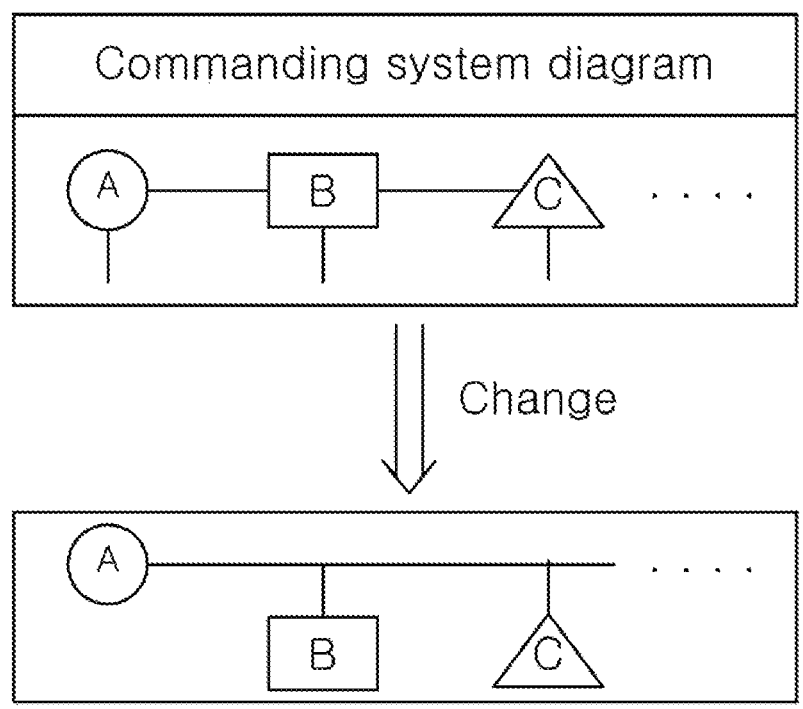
FIGS. 6 and 7 are views showing an example of changing a communication environment according to an embodiment.
Figure 7:
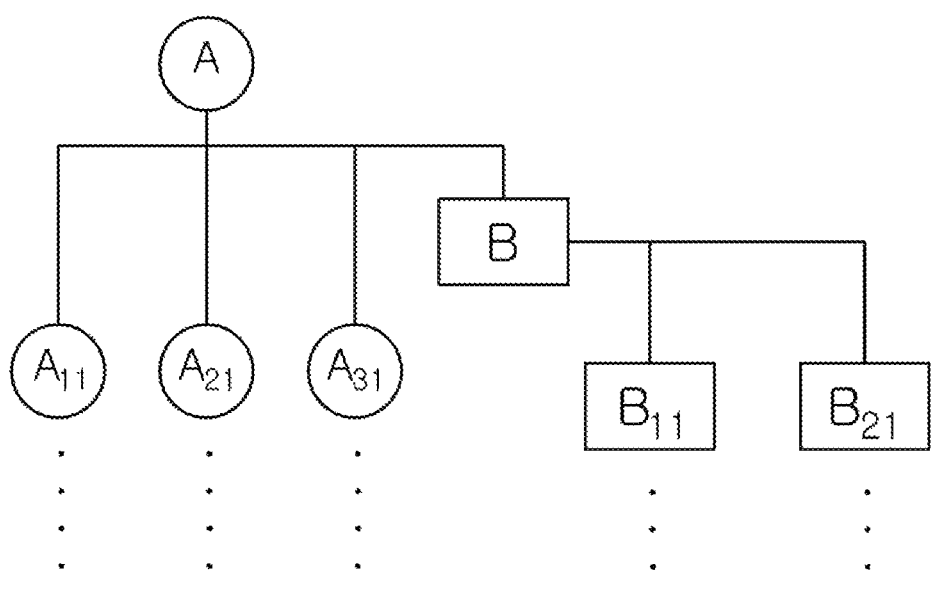

FIGS. 6 and 7 are views showing an example of changing a communication environment according to an embodiment.

First, referring to FIG. 6, the group status information provided by the management module 120 to the management system 200 may include commanding system information as shown in FIG. 6. According to embodiments, as shown in FIG. 6, only a commanding system diagram for a commanding line, not for all organization members, may be extracted and displayed on the management system 200.

For example, in FIG. 6, it may be a commanding system diagram showing that a first operation group of commander A, a second operation group of commander B, and a third operation group of C commander are in operation, and each operation group may be an individual operation group. That is, it may be a situation in which the operation group do not belong to one commanding system.

In this situation, the commanding headquarters may feel the need of reorganizing individual operation groups into one unified commanding system. For example, although operation groups may work by metropolitan city or province in the case of a large-scale disaster, when it is determined that a smooth and cooperative commanding system is needed among them, it may be necessary to place any one operation group under the command of another operation group.

In this case, the management system 200 may simply reconfigure the communication environment of the field into an environment after the change by manipulating the commanding system diagram of the currently displayed group status information.

For example, in the commanding system diagram shown in FIG. 6, when it is desired to place the commander B of the second operation group and the commander C of the third operation group under the command of the commander A of the first operation group so that the commander A of the first operation group may direct the operation of the integrated operation group, the management system 200 may transmit commanding authority transfer signals of the commander B of the second operation group and the commander C of the third operation group to the management module 120 of the disaster site integrated commanding and operating system 100 by drag-and-dropping the icons of the commander B of the second operation group and the commander C of the third operation group under the commander A or through a simple handing by use of various interfaces.

Then, in response to the commanding authority transfer signals, the setting module 130 may reorganize the first operation group, the second operation group, and the third operation group as an integrated operation group to correspond to the commanding system corresponding to the transfer of commanding authority, and an example thereof may be as shown in FIG. 7.

FIG. 7 shows only a case in which the second operation group is incorporated under the command of the first operation group for convenience of explanation, and also shows the commanding system of only the commander of the operation group or a sub-operation team.

As shown in FIG. 7, due to the incorporation of the second operation group, the commanding system may be changed to place four sub-operation teams under the commander A. The second operation group may be an incorporated sub-operation team (B is the commander) of the first operation group, and the organization of the integrated operation group and the commanding system may be changed to place sub-operation teams (B11 and B12 are commanders of the teams) under the incorporated sub-operation teams.

Also, when any one operation group is incorporated into another operation group, it does not need to be incorporated only into the commanding system as shown in FIG. 7 and may be incorporated in various ways. For example, unlike FIG. 7, the commanding system may be set to appoint commander B under the command of commander A as a deputy commander of the integrated operation group, and organize sub-teams of the first operation group and the sub-teams of the second operation group under the command of the deputy commander B.

The method of changing the commanding system and the organization when the commanding authority of any one operation group is transferred and the operation group is incorporated into another operation group may be defined in advance by the management system 200 and stored in the DB 140 of the disaster site integrated commanding and operating system 100, and with reference to this, the setting module 130 of the disaster site integrated commanding and operating system 100 may automatically reconfigure the commanding system and the organization of the integrated operation group.

Then, the control module 110 may output a control signal to reset the communication environment of the communication terminals to correspond to the reorganized integrated operation group as described above.

The method of providing a disaster site integrated commanding and operating system according to an embodiment may be implemented as a computer-readable code in a computer-readable recording medium. The non-transitory computer-readable recording medium includes all types of recording devices for storing data that can be read by a computer system.

Examples of the computer-readable recording medium include RAM, ROM, CD-ROM, magnetic tapes, hard disks, floppy disks, and optical data storage devices. In addition, the computer-readable recording medium may be distributed in computer systems connected through a network to store and execute computer-readable codes in a distributed manner. In addition, functional programs, codes, and code segments for implementing the present invention can be easily inferred by programmers skilled in the art.

As described above, according to embodiments of the invention, since it is possible to collectively set, change, and control by using organization information or commanding system information of the commanding side, instead of providing communications for a commanding network and an operation network or individually setting the communications using a disaster safety communication network (e.g., PS-LTE network), there is an effect of rapidly preparing for deployment of resources and performing operations in a disaster site. In addition, there is an effect of rapidly reflecting a wireless communication environment according to an operation situation through a relatively simple work of the commanding side even when the commanding network or the operation network needs to be changed according to a situation in the field.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of providing a disaster site integrated commanding and operating system, the method comprising the steps of:
   receiving, by the disaster site integrating commanding and operating system, organization information for responding to a disaster site;
   specifying, by the disaster site integrating commanding and operating system, a first operation group corresponding to the organization information, by the disaster site integrated commanding and operating system, wherein the first operation group includes a first commanding network group corresponding to a first commanding network including a first communication terminal of at least one first commanding officer, and a first operation network group corresponding to a first operation network including second communication terminals of a plurality of operation resources included in the organization information; and
   transmitting a control signal to perform grouping of communication terminals connected to a disaster safety communication network for each group network of the specified first commanding network and the first operation network, wherein
   each of the first communication terminal and the second communication terminals is set to follow, based upon the transmitted control signal, a group rule predetermined in a corresponding group.

2. The method according to claim 1, further comprising a step of storing information on group status of each working group including the first commanding network group and the first operation network group included in the first operation group, wherein a setting rule is capable of being set for each working group.

3. The method according to claim 2, wherein the setting rule is set for each group, and includes at least one of: a) information rules about recording or videotaping field situations, and b) inquiring or replaying information performed during an operation.

4. The method according to claim 1, wherein the organization information includes information on a plurality of operation teams including a first operation team and a second operation team, and the step of specifying a first operation group includes a step of separately specifying a sub-operation network group corresponding to each of the first operation team and the second operation team.

5. The method according to claim 1, wherein the group rule includes a communication rule for specifying a communication target, which is another communication terminal belonging to a predetermined group, capable of receiving information input into a communication terminal included in the corresponding group.

6. The method according to claim 1, further comprising the steps of:
   maintaining, by the disaster site integrating commanding and operating system, information on a second operation group including a second commanding network group and a second operation network group;
   receiving, by the disaster site integrating commanding and operating system, a commanding authority transfer signal for transferring commanding authority so that a second commanding officer corresponding to the second operation group is under command of a first commanding officer corresponding to the first operation group; and
   reorganizing, by the disaster site integrating commanding and operating system and in response to the command authority transfer signal, an integrated operation group integrating the first operation group and the second operation group to correspond to a commanding system corresponding to the transfer of commanding authority.

7. The method according to claim 1, wherein the disaster safety communication network is a Public Safety-Long Term Evolution (PS-LTE) communication network.

8. A non-transitory computer-readable storage medium having stored thereon processor-executable instructions for performing the method according to claim 1.

9. A method of providing a disaster site integrated commanding and operating system, the method comprising the steps of:
   receiving, by the disaster site integrating commanding and operating system, organization information for responding to a disaster site;
   specifying, by the disaster site integrating commanding and operating system, communication terminals accessible to a disaster safety communication network as a plurality of groups to correspond to the received organization information;
   grouping the communication terminals by transmitting a control signal so that grouping corresponding to the plurality of specified groups may be performed;
   outputting, to a management system, commanding system information including group status information of the plurality of grouped groups;
   receiving, by the disaster site integrating commanding and operating system as output by the management system, a change request for changing the commanding system information; and regrouping, by the disaster site integrating commanding and operating system, the communication terminals to correspond to the change request in response to the received change request.

10. A non-transitory computer-readable storage medium having stored thereon processor-executable instructions for performing the method according to claim 9.

11. The method according to claim 9, wherein the organization information includes information on a plurality of operation teams including a first operation team and a second operation team.

12. The method according to claim 9, wherein the disaster safety communication network is a Public Safety-Long Term Evolution (PS-LTE) communication network.

13. A disaster site integrated commanding and operating system comprising:
a management module configured to receive organization information for responding to a disaster site;
a setting module configured to specify a first operation group including a first commanding network group corresponding to a first commanding network including a first communication terminal of at least one first commanding officer included in the received organization information among communication terminals accessible to a disaster safety communication network, and a first operation network group corresponding to a first operation network including second communication terminals of a plurality of operation resources included in the organization information; and
a control module configured to transmit a control signal so that grouping of communication terminals connected to the disaster safety communication network is performed for each group network of the specified first commanding network and first operation network, wherein
each of the first communication terminal and the second communication terminals is set to follow a setting rule predetermined in a corresponding group, based upon the transmitted control signal.

14. The system according to claim 13, wherein the management module stores information on group status for each working group including the first commanding network group and the first operation network group included in the first operation group, and sets the setting rule for each working group.

15. The system according to claim 13, wherein when the setting module receives a commanding authority transfer signal for transferring commanding authority from the management module so that a second commanding officer corresponding to a second operation group is under command of a first commanding officer corresponding to the first operation group, the setting module reorganizes, while maintaining information on a second operation group including a second commanding network group and the second operation network group, an integrated operation group integrating the first operation group and the second operation group to correspond to a commanding system corresponding to the transfer of commanding authority in response to the received commanding authority transfer signal.

16. The system according to claim 13, wherein the setting rule is set for each group, and includes at least one of: a) information rules about recording or videotaping field situations, and b) inquiring or replaying information performed during an operation.

17. A disaster site integrated commanding and operating system comprising:
a management module configured to receive organization information for responding to a disaster site;
a setting module configured to specify communication terminals accessible to a disaster safety communication network as a plurality of groups to correspond to the received organization information; and
a control module configured to group the communication terminals by transmitting a control signal so that grouping corresponding to the plurality of specified groups may be performed, wherein
the management module displays commanding system information including group status information of the plurality of grouped groups on a management system, and receives a change request for changing the commanding system information from the management system, and the setting module regroups the communication terminals to correspond to the change request in response to the received change request.

18. The system according to claim 17, wherein the organization information includes information on a plurality of operation teams including a first operation team and a second operation team.

19. The system according to claim 18, wherein the disaster safety communication network is a Public Safety-Long Term Evolution (PS-LTE) communication network.

20. The system according to claim 17, wherein the disaster safety communication network is a Public Safety-Long Term Evolution (PS-LTE) communication network.

* * * * *